US005186749A

United States Patent [19]
Allred

[11] Patent Number: 5,186,749
[45] Date of Patent: Feb. 16, 1993

[54] HIGH STRENGTH WATER RESISTANT CEMENTITIOUS COMPOSITIONS

[76] Inventor: Robert G. Allred, 429 Eastview Dr., Alpin, Utah 84004

[21] Appl. No.: 765,871

[22] Filed: Sep. 26, 1991

[51] Int. Cl.$^5$ .......................... C04B 24/04; C04B 7/02
[52] U.S. Cl. .................................. 106/810; 106/661; 106/664; 106/638
[58] Field of Search ............... 106/802, 808, 810, 822, 106/823, 661, 664, 638

[56] References Cited

U.S. PATENT DOCUMENTS 3,817,767  6/1974  Bozer et al. ........................ 106/90
3,955,914  5/1976  Hunter et al. ....................... 106/90
4,263,191  4/1981  Eck et al. ............................ 524/3

Primary Examiner—Paul R. Michl
Assistant Examiner—LaVonda DeWitt
Attorney, Agent, or Firm—Mallinckrodt & Mallinckrodt

[57] ABSTRACT

Previous weather resistant cementitious compositions in which succinic acid derivatives were incorporated to improve weather resistance have been found to suffer from an undesirable decrease in compressive strength. In accordance with the invention, compressive strength is significantly increased without substantially reducing weather reistance by adding an antifoam agent to the mixture prior to setting into a solid.

8 Claims, No Drawings

HIGH STRENGTH WATER RESISTANT CEMENTITIOUS COMPOSITIONS

Background of the Invention

1. Field

The present invention relates to a water resistant cementitious composition.

2. State of the Art

The life of cementitious materials such as concrete and stucco is shortened by the influence of weather and temperature fluctuations and other conditions, including ice and deicing materials such as sodium chloride or calcium chloride. In the past, various additives have been proposed which were aimed at preventing the deterioration of cementitious materials due to the harmful action of such conditions and materials.

Among the materials that have been found particularly effective at improving the weather resistance and overall durability of cementitious compositions are alkyl and alkenyl succinic acids, their anhydrides, acid esters, acid amides, halogenated compounds and salts thereof, when the alkyl and alkenyl substituents contain 7 to 40 carbon atoms. U.S. Pat. No. 3,817,767 issued to Bozer et al., Jun. 18, 1974 and U.S. Pat. No. 3,955,944 issued to Hunter et al., May 11, 1976 disclose the addition of such compounds to cementitious compositions and what amounts are considered effective. These compounds have been found to be convenient and effective when incorporated into the cementitious mix in amounts ranging from about 0.05% to about 0.2%.

SUMMARY OF THE INVENTION

It has now been found that, upon incorporating effective amounts of alkyl and alkenyl succinic acids and their derivatives as taught by the prior art, such incorporation undesirably results in appreciable decreases in the compressive strength due to the entrainment of air in the finished, cured, cementitious material. It has also been found that most of the d-decrease in compressive strength of cementitious compositions can be prevented by the addition of antifoam agents to the composition without undermining the improved weather resistance obtained by virtue of the incorporation of alkyl and alkenyl succinic acids or their derivatives.

DETAILED DESCRIPTION OF THE A PREFERRED EMBODIMENT

The cementitious compositions of concern here are compositions of matter that are adapted to be cured upon hydration to obtain a solid, for example, portland cement, concrete, and stucco. In accordance with the invention, the compositions contain cementitious material, an alkyl or alkenyl succinic acid or a derivative of same, and an antifoam agent.

Succinic acid derivatives of the general formula:

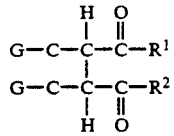

were known. In the general formula: at least one G may be an alkyl, haloalkyl or alkenyl group having from 6 to 40 carbon atoms and the other G independently represents hydrogen, an alkyl, haloalkyl, or alkenyl group having from 6 to 40 carbon atoms; $R^1$ and $R^2$ may be the same or different, and may be $NR^3R^4$ or $-OR^5$, wherein $R^3$, $R^4$, or $R^5$ may be the same or different, and may be hydrogen or an alkyl group having 1 to 3 carbon atoms—provided that at least one of the $R^1$ and $R^2$ groups is a hydroxy moiety; and their ammonia, amine or metal salts, or $R^1$ and $R^2$ combined represent a single divalent oxygen atom. It was also known that the incorporation of such succinic acid derivatives into a cementitious composition prior to the composition setting into a solid would increase the weather resistance, the resistance to absorption of water, and resistance to degradation by deicing materials.

The incorporation of such succinic acid derivatives into cementitious compositions results in excess entrainment of air. Excess air results in a decrease in the compressive strength of the finished and cured cementitious material. However, the addition of an antifoam agent to such prior art water resistant cementitious compositions significantly counters the tendency of such compositions to entrap excess air and greatly improves the compressive strength of the cured cementitious compositions.

Only low levels of antifoam agent are required. Amounts as low as a few thousands of a percent, e.g., 0.0049%, have been found effective. Many antifoam agents are commercially available. One preferred antifoam agent is the commercially available "Antifoam 1520-US" from DOW CORNING. This particular product contains polydimethylsiloxane, tristearate, glyceryl monostearate, methylcellulose, EO glycol, silica, xantham gum, benzoic acid, and sulfuric acid. One of the primary active antifoam agents in Antifoam 1520-US is the polyorganosiloxane polydimethylsiloxane. However, other polyorganosiloxanes are known to have foam depressant activity and are suitable alternatives. (See U.S. Pat. No. 4,039,345 issued to Emig et al., Aug. 2, 1977).

Other commercially available antifoam products can be used in place of or in addition to Antifoam 1520-US and one another. Example's include Dow-Corning's 1510, Antifoam A, and Antifoam B and General Electric's AF 20 and AF 75. Other classes of antifoam agents such as other silicone based antifoams, polyalkylene glycols, fatty acids, and ethanolamines are well known antifoam agents and can be employed as well.

An experiment was performed to demonstrate the increased compressive strength of weather resistant concrete obtained by the incorporation of an antifoam agent. The particular succinic acid derivative employed in making up the concrete test samples was Dipotassium dodeccenyl succinate [DKDS]. The antifoam agent employed was Antifoam 1520-US. The percentages shown are dry solids weight of reagent to weight of wet concrete. Five concrete samples were prepared using a typical concrete formulation with the addition of DKDS and antifoam agent according to Table I.

TABLE I

| | AMOUNT DKDS | AMOUNT ANTIFOAM AGENT |
|---|---|---|
| Sample 1 | 0 | 0 |
| Sample 2 | 0.098% | 0 |
| Sample 3 | 0.098% | 0.0049% |
| Sample 4 | 0.098% | 0.0098% |
| Sample 5 | 0.196% | 0.0196% |

The samples were allowed to cure an adequate length of time under ambient conditions and then, as an indication of the weather resistance of the samples, the percent moisture retained was measured. The results are shown in Table II.

TABLE II

PERCENT MOISTURE RETAINED

| Sample 1 | 3.6% |
|---|---|
| Sample 2 | 2.1% |
| Sample 3 | 1.0% |
| Sample 4 | 0.7% |
| Sample 5 | 0.6% |

The percent of air entrained in each of the five samples as well as the compressive strength was also measured. The results are shown in Table III.

TABLE III

| | Percent Air Entrained | 7 Day Compressive Strength |
|---|---|---|
| Sample 1 | 4.5% | 3110 psi |
| Sample 2 | 10.8% | 1965 psi |
| Sample 3 | 8.9% | 2230 psi |
| Sample 4 | 7.4% | 2870 psi |
| Sample 5 | 8.8% | 2530 psi |

[psi = pounds per square inch]

In general, the test concrete samples showed that weather resistance (as demonstrated by decreased percent water retention) was maintained while the amount of reduction in air entrained and compressive strength caused by the addition of a succinic acid derivative was diminished by the addition of an antifoam agent. That is, there was less of a decrease in compressive strength upon the addition of an antifoam agent. Concrete Samples 2–4, each of which contained an effective amount of a succinic acid derivative, had an expected reduction in water retention in comparison with concrete Sample 1 which contained no succinic acid derivative. Concrete Samples 3, 4, and 5 which contained an antifoam agent in addition to a succinic acid derivative had greater 7 day compressive strength than Sample 2 which contained only a succinic acid derivative although the 7 day compressive strength of Samples 3 and 5 still showed a rather large reduction in compressive strength in comparison to control Sample which contained no succinic acid derivative. Sample 4 with a compressive strength of 2870 psi had the highest 7 day compressive strength of the test samples and came closest to the 3110 psi compressive strength of control Sample 1.

In the example Antifoam 1520-US was employed in amounts ranging from 0.0049% to 0.0196%. Extrapolating from the results, amounts less than about 0.002% plus or minus 0.001% of Antifoam 1520-US would be expected to afford some protection against loss of compressive strength. It is not expected that there would be any upper limit on the amount of Antifoam 1520-US employed, although at its cost (which approaches $10.00 per pound dry solids weight), it is desirable to add a minimally effective amount. Nevertheless, extrapolating from the example, it is expected that the protection against loss of compressive strength is probably maximized at about 0.2% plus or minus 0.1% or perhaps even as high as 1.0% plus or minus 0.5%.

The effective amount of other antifoam agents can vary with the relative effectiveness of the other agents with respect to Antifoam 1520-US. However, published tables provide information regarding the relative effectiveness of these other agents and enable the practitioner to determine what amount of these other antifoam agents that is roughly equivalent to Antifoam 1520-US.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. In a composition of matter adapted to be cured upon hydration to obtain a solid and which comprises a cementitious material; and an effective amount of a chemical compound of the general formula:

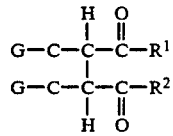

where at least one G may be an alkyl, haloalkyl or alkenyl group having from 6 to 40 carbon atoms, and the other G independently represents hydrogen, an alkyl, haloalkyl, or alkenyl group having from 6 to 40 carbon atoms, $R^1$ and $R^2$ may be the same or different, and may be $NR^3R^4$ or $—OR^5$, wherein $R^3$, $R^4$, or $R^5$ may be the same or different, and may be hydrogen or an alkyl group having 1 to 3 carbon atoms—provided that at least one of the $R^1$ and $R^2$ groups is a hydroxy moiety; and their ammonia, amine or metal salts, or $R^1$ and $R^2$ combined represent a single divalent oxygen atom:

an amount of an antifoam agent effective to significantly upgrade the compressive strength of the cured solid.

2. A composition according to claim 1 wherein the antifoam agent is a polyorganosiloxane.

3. A composition according to claim 1 wherein the antifoam agent is selected from the group of antifoam agents consisting of silicone based antifoams, polyalkylene glycols, fatty acids, ethanolamines, and combinations thereof.

4. A composition according to claim 1 wherein said chemical compound is a succinic acid or derivative and is present in an amount ranging from about 0.1% to about 0.5% weight dry solids to wet cementitious material.

5. A composition according to claim 1 wherein the chemical compound is dipotassium dodeccenyl succinate.

6. A composition according to claim 5 wherein the dipotassium dodeccenyl succinate is present in an amount ranging from 0.1% to 0.5% weight dry solids to wet cementitious material.

7. A composition according to claim 1 wherein the antifoam agent is present in an amount ranging from about 0.002% to about 1.0% weight dry solids to wet cementitious material.

8. A composition according to claim 1 wherein the antifoam agent is present is an amount ranging from about 0.002% to about 0.2% weight dry solids to wet cementitious material.

* * * * *